(12) United States Patent
Janecek

(10) Patent No.: US 12,492,781 B2
(45) Date of Patent: Dec. 9, 2025

(54) GREASE INHIBITOR

(71) Applicant: Electric Torque Machines, Inc., Minneapolis, MN (US)

(72) Inventor: Thomas F. Janecek, Flagstaff, AZ (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 18/718,782

(22) PCT Filed: Dec. 14, 2022

(86) PCT No.: PCT/US2022/052835
§ 371 (c)(1),
(2) Date: Jun. 11, 2024

(87) PCT Pub. No.: WO2023/114290
PCT Pub. Date: Jun. 22, 2023

(65) Prior Publication Data
US 2025/0052367 A1     Feb. 13, 2025

Related U.S. Application Data

(60) Provisional application No. 63/290,793, filed on Dec. 17, 2021.

(51) Int. Cl.
*F16N 11/08*     (2006.01)
*F16C 33/66*     (2006.01)
*F16J 15/34*     (2006.01)

(52) U.S. Cl.
CPC .......... *F16N 11/08* (2013.01); *F16C 33/6603* (2013.01); *F16J 15/34* (2013.01); *F16C 2380/26* (2013.01); *F16N 2210/18* (2013.01)

(58) Field of Classification Search
CPC .......... F16C 33/76607; F16C 33/76603; F16C 2380/26; F16C 33/76; F16C 2361/43;
(Continued)

(56) References Cited

U.S. PATENT DOCUMENTS 1,072,421 A  *  9/1913  Brown .................. F16C 35/077
                                                        384/480
1,991,614 A  *  2/1935  Jonn ........................ F16C 33/76
                                                        277/430
(Continued)

FOREIGN PATENT DOCUMENTS

DE              29500878 U1    10/1995
DE          102010018145 A1    10/2011
(Continued)

OTHER PUBLICATIONS

International Search Report and Written Opinion for PCT Application No. PCT/US2022/052835, Dated May 2, 2023, pp. 14.
(Continued)

*Primary Examiner* — Anna M Momper
*Assistant Examiner* — Mark K Buse
(74) *Attorney, Agent, or Firm* — Kinney & Lange, P.A.

(57) ABSTRACT

A grease inhibitor is disposed about a rotating shaft of an electric machine. The grease inhibitor is configured to inhibit flow of grease towards electromagnetic components of the electric machine along the shaft. The grease inhibitor includes an inner member that rotates with the shaft and that interfaces with a static component to form the grease inhibiting interface.

16 Claims, 9 Drawing Sheets

(58) Field of Classification Search
CPC .. F16C 33/6607; F16C 33/6603; F16C 33/66; F16C 33/766; F16H 57/029; F16N 11/08; F16N 2210/18; F16J 15/34; F16J 15/3448; H04N 23/555; F16B 2/005; F16D 23/14; B05B 13/0627

See application file for complete search history.

(56) References Cited

U.S. PATENT DOCUMENTS

| | | | |
|---|---|---|---|
| 2,243,318 | A | 5/1941 | William |
| 3,150,822 | A | 9/1964 | Paul et al. |
| 4,958,940 | A * | 9/1990 | Morrill ............... F16N 7/366 384/398 |
| 5,306,183 | A | 4/1994 | Holt et al. |
| 6,276,831 | B1 * | 8/2001 | Takahashi ............ F16C 17/107 384/123 |
| 6,659,747 | B2 * | 12/2003 | Yamamoto ........... F04C 27/009 418/104 |
| 6,924,579 | B2 | 8/2005 | Calley |
| 7,090,401 | B2 * | 8/2006 | Rahman .............. F16C 17/107 384/114 |
| 7,199,500 | B2 | 4/2007 | Yoshida |
| 7,441,957 | B2 * | 10/2008 | Hong ................. F16C 17/026 384/100 |
| 7,626,308 | B2 | 12/2009 | Kang et al. |
| 7,876,019 | B2 | 1/2011 | Calley |
| 8,242,658 | B2 | 8/2012 | Calley et al. |
| 8,395,291 | B2 | 3/2013 | Calley et al. |
| 8,405,275 | B2 | 3/2013 | Calley et al. |
| 8,415,848 | B2 | 4/2013 | Calley et al. |
| 8,749,108 | B2 | 6/2014 | Dyer et al. |
| 8,760,023 | B2 | 6/2014 | Calley et al. |
| 8,854,171 | B2 | 10/2014 | Janecek |
| 8,952,590 | B2 | 2/2015 | Calley et al. |
| 8,970,205 | B2 | 3/2015 | Janecek et al. |
| 8,994,243 | B2 | 3/2015 | Calley et al. |
| 9,006,951 | B2 | 4/2015 | Janecek et al. |
| 9,236,773 | B2 | 1/2016 | Janecek et al. |
| 9,360,020 | B2 | 6/2016 | Janecek |
| 9,509,181 | B2 | 11/2016 | Janecek et al. |
| 9,618,003 | B2 | 4/2017 | Janecek et al. |
| 9,749,108 | B2 | 8/2017 | Hoshino et al. |
| 11,646,635 | B2 | 5/2023 | Janecek et al. |
| 2002/0074891 | A1 | 6/2002 | Gieras et al. |
| 2004/0046478 | A1 | 3/2004 | Zierer et al. |
| 2005/0012427 | A1 | 1/2005 | Seki et al. |
| 2009/0206696 | A1 | 8/2009 | Calley |
| 2011/0221298 | A1 | 9/2011 | Calley et al. |
| 2012/0119599 | A1 | 5/2012 | Calley et al. |
| 2012/0119609 | A1 | 5/2012 | Janecek |
| 2012/0234108 | A1 | 9/2012 | Janecek et al. |
| 2012/0235519 | A1 | 9/2012 | Dyer et al. |
| 2013/0002068 | A1 | 1/2013 | Miyasaka et al. |
| 2013/0015733 | A1 | 1/2013 | Rasch et al. |
| 2015/0048712 | A1 | 2/2015 | Janecek et al. |
| 2015/0147188 | A1 | 5/2015 | Danielsson |
| 2016/0305480 | A1 * | 10/2016 | Wang .................. F16C 33/6629 |
| 2017/0074320 | A1 * | 3/2017 | Kikuchi ................ H02K 5/165 |
| 2017/0113773 | A1 | 4/2017 | Kaiser et al. |
| 2018/0186181 | A1 * | 7/2018 | Tada .................... F16C 19/186 |
| 2019/0101212 | A1 * | 4/2019 | Sato .................... F16J 15/3252 |
| 2020/0031445 | A1 | 1/2020 | Wei |
| 2020/0083762 | A1 | 3/2020 | Nitta et al. |
| 2023/0058117 | A1 | 2/2023 | Williams et al. |
| 2023/0109061 | A1 * | 4/2023 | Orii ...................... F16H 57/029 |

FOREIGN PATENT DOCUMENTS

| | | |
|---|---|---|
| DE | 102011084296 A1 | 4/2013 |
| DE | 112014006362 T5 | 11/2016 |
| EP | 1063754 A2 | 12/2000 |
| EP | 1587207 A1 | 10/2005 |
| EP | 2006977 A2 | 12/2008 |
| EP | 2159903 A2 | 3/2010 |
| EP | 2594477 A1 | 5/2013 |
| EP | 2686939 A2 | 1/2014 |
| EP | 3082231 A1 | 10/2016 |
| GB | 167624 A | 8/1921 |
| GB | 2491880 A | 12/2012 |
| JP | 2006112548 A | 4/2006 |
| JP | 2009005420 A | 1/2009 |
| RU | 2741052 * | 1/2021 |
| RU | 2741052 C1 | 1/2021 |
| WO | 2010064368 A1 | 6/2010 |
| WO | 2012125790 A2 | 9/2012 |
| WO | 2015089518 A1 | 6/2015 |
| WO | 2015163871 A1 | 10/2015 |
| WO | 2021163156 A1 | 8/2021 |
| WO | 2021245920 A1 | 12/2021 |
| WO | 2022035940 A1 | 2/2022 |
| WO | 2022066616 A2 | 3/2022 |
| WO | 2022165015 A1 | 8/2022 |
| WO | 2023043904 A1 | 3/2023 |
| WO | 2023055690 A2 | 4/2023 |
| WO | 2023114290 A1 | 6/2023 |

OTHER PUBLICATIONS

International Preliminary Report on Patentability for PCT Application No. PCT/US2022/052835, Dated Jun. 27, 2024, pp. 9.

* cited by examiner

GREASE INHIBITOR

CROSS-REFERENCE TO RELATED APPLICATION(S)

This application is a 371 national stage application of PCT International Application No. PCT/US2022/052835, filed Dec. 14, 2022 and entitled "GREASE INHIBITOR," which claims the benefit of U.S. Provisional Application No. 63/290,793 filed Dec. 17, 2021 and entitled "GREASE SEAL," the disclosures of which is hereby incorporated by reference in its entirety.

BACKGROUND

The present disclosure relates generally to machines requiring grease lubrication. More specifically, the present disclosure relates to rotating motors that require grease lubrication. Electric motors utilize electricity to generate a mechanical output. Some electric motors generate rotational outputs. The rotating output is generated by a shaft of the electric motor. The rotating shaft is supported by bearings that require lubrication.

SUMMARY

According to an aspect of the disclosure, a grease inhibitor includes a vertically orientated shaft configured to rotate on an axis; an inner member configured to rotate with the shaft, the inner member having a cylindrical outer surface and at least one groove formed on the cylindrical outer surface; and an outer ring within which the at least one groove rotates to one or both of pump grease up in a first axial direction along an annular interface between the outer ring and the cylindrical outer surface and prevent the grease from leaking downward in a second axial direction along the annular interface, wherein the outer ring is spaced radially from the cylindrical outer surface.

According to an additional or alternative aspect of the disclosure, a method of inhibiting grease flow along a vertical axis includes driving rotation of a vertically oriented shaft on an axis, the shaft extending upward in a first axial direction along the axis into a grease reservoir holding a volume of grease and the shaft rotatably supported by a bearing assembly disposed within the grease reservoir; and rotating an inner member, with the shaft, relative to an outer ring spaced radially from a cylindrical outer surface of the inner member such that at least one groove formed on the cylindrical outer surface of the inner member one or both of pumps grease up in a first axial direction along an annular interface between the outer ring and the cylindrical outer surface and prevent the grease from leaking downward in a second axial direction along the annular interface.

According to another additional or alternative aspect of the disclosure, a grease inhibitor includes a vertically orientated shaft configured to rotate on an axis; an inner member configured to rotate with the shaft; an outer ring within which the shaft rotates; and a dynamic ring seal mounted on the outer ring, the dynamic ring seal extending inward to overlap with the inner member, the inner member rotating relative to the dynamic seal, the dynamic ring seal configured to bend to engage the inner round member in response to increased grease pressure, the increased grease pressure pushing grease against the dynamic seal ring to flex the dynamic ring seal against the inner member to inhibit migration of grease along the vertically oriented shaft.

DETAILED DESCRIPTION

The present disclosure concerns electric machines, such as electric motors. The electric machines of this disclosure include a rotor rotatable about a motor axis and a stator configured to drive rotation of the rotor. The rotor is rotatably supported by one or more bearings. The bearings are lubricated by grease. The grease can be held within a grease reservoir that the bearing is at least partially disposed within.

According to aspects of the disclosure, a grease retainer can be mounted to the shaft to rotate with the shaft. The grease retainer is closely disposed to a stationary outer ring such that a grease dam is formed therebetween. The grease retainer includes grooves formed on the exterior of the grease retainer and oriented towards the outer ring that are configured to capture grease at the interface between the grease retainer and outer ring and advance the grease towards the grease reservoir.

According to aspects of the disclosure, a grease seal can be disposed to inhibit flow of the grease out of the grease reservoir. The grease seal is normally spaced away from and not engaged with an opposing surface. The grease seal is configured to flex in response to pressure within the grease reservoir, such as when grease is filled into the reservoir, to engage with an opposing surface to form a seal therebetween. The grease seal prevents undesirable grease leakage during filling of the reservoir when the pressures within the grease reservoir are raised relative to normal operating pressures.

Components can be considered to radially overlap when those components are disposed at common axial locations along common axis CA. A radial line extending from common axis CA will extend through each of the radially overlapping components. Components can be considered to axially overlap when those components are disposed at common radial and circumferential locations such that an axial line parallel to common axis CA extends through the axially overlapping components. Components can be considered to circumferentially overlap when aligned about common axis CA, such that a circle centered on common axis CA passes through the circumferentially overlapping components.

Figure 1:
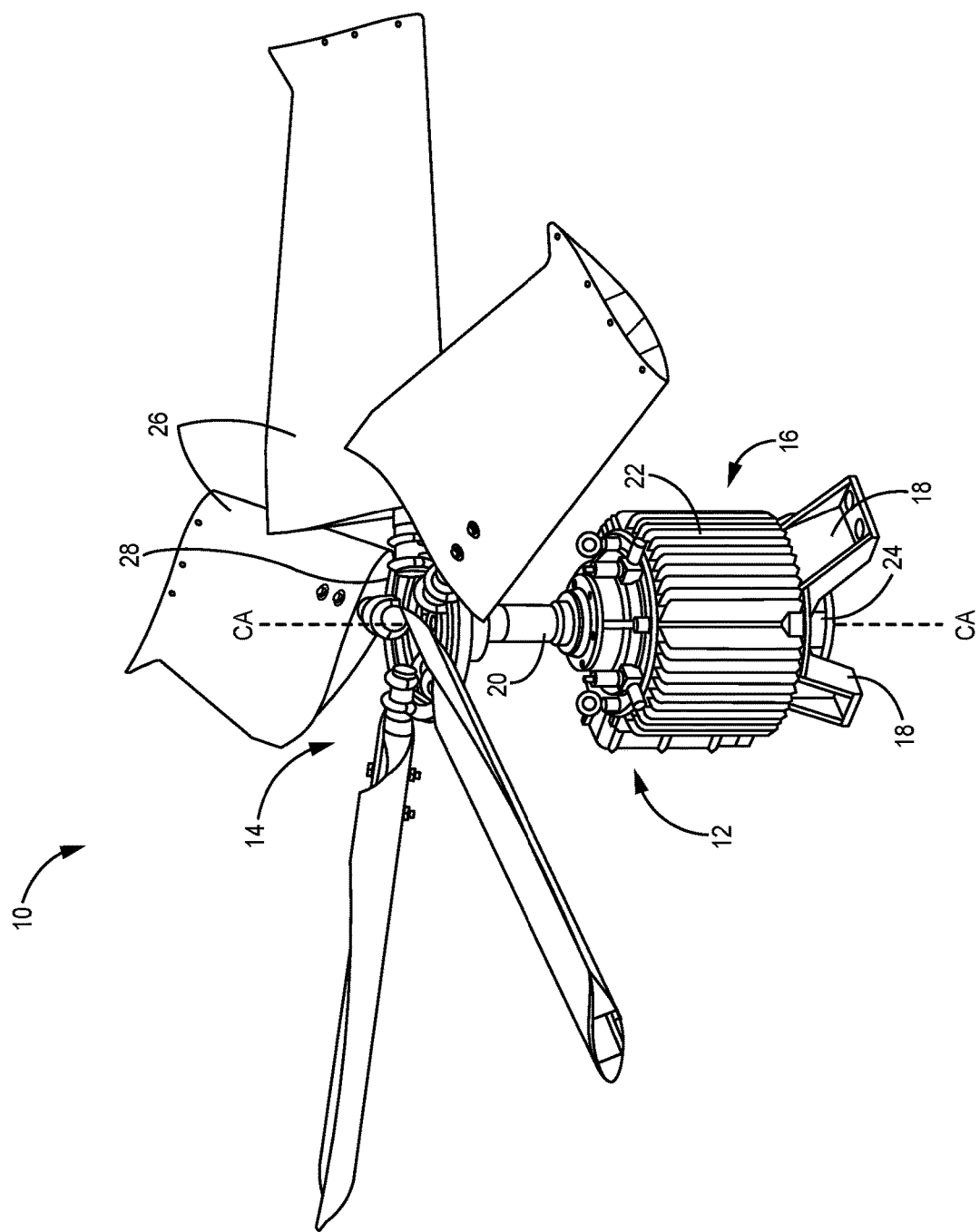
FIG. 1 is an isometric view of a fan system.

FIG. 1 is an isometric view of fan system 10. Fan system 10 includes motor 12 and blade assembly 14. Motor housing 16, supports 18, and drive shaft 20 of motor 12 are shown. Motor housing 16 includes stator housing 22 and bearing housing 24. Blades 26 and fan hub 28 of blade assembly 14 are shown.

Motor 12 is an electric motor configured to generate a rotating mechanical output. In the example shown, motor 12 is configured to generate the output coaxially with common axis CA. Motor housing 16 encloses other components of motor 12. In the example shown, motor housing 16 includes a first, larger diameter portion and a second, smaller diameter portion. The first portion is formed by stator housing 22 and the second portion is formed by bearing housing 24. Both stator housing 22 and bearing housing 24 enclose rotating components of motor 12. Electric components of motor 12 are disposed, at least partially, within stator housing 22.

Supports 18 extend axially from stator housing 22 and are configured to interface with a support surface. In some examples, supports 18 can rest on the support surface such that stator housing 22 extends vertically above supports 18. Bearing housing 24 is disposed a lower axial end of stator housing 22 opposite blade assembly 14. Bearing housing 24 can thereby be disposed vertically between stator housing 22 and the support surface. In the example shown, bearing housing 24 has a smaller diameter than stator housing 22 and is located vertically below stator housing 22.

Blade assembly 14 is connected to motor 12 to be rotated by motor 12. Drive shaft 20 extends from motor 12 to provide the rotating mechanical output from motor 12 to blade assembly 14 to rotate blades 26 on common axis CA. Fan hub 28 is disposed at an end of drive shaft 20 opposite motor 12. More specifically, fan hub 28 is disposed at a distal end of drive shaft 20 opposite a second distal end of drive shaft 20 extending into bearing housing 24. Blades 26 extend radially outward from fan hub 28. In the example shown, motor 12 and blade assembly 14 are disposed coaxially on common axis CA such that blades 26, fan hub 28, drive shaft 20, and the rotor of motor 12 rotate coaxially.

In the example shown, fan system 10 is configured such that blade assembly 14 is disposed vertically above motor 12. For example, fan system 10 can be configured for use in a cooling tower. It is understood that, while vertically oriented fans are discussed, fans according to the present disclosure can be oriented in any desired orientation and can be used to move any desired fluid, including gas and/or liquid. Further, while motor 12 is described as driving blade assembly 14, it is understood that any one or more aspects of motor 12 can be implemented in non-fan applications. Motor 12 can be configured for use in any desired electric motor assembly. It is thus understood that, while a fan is one implementation of the motor technologies presented herein, other applications, including non-fan applications, are possible and contemplated as within the scope of the disclosure.

Figure 2A:
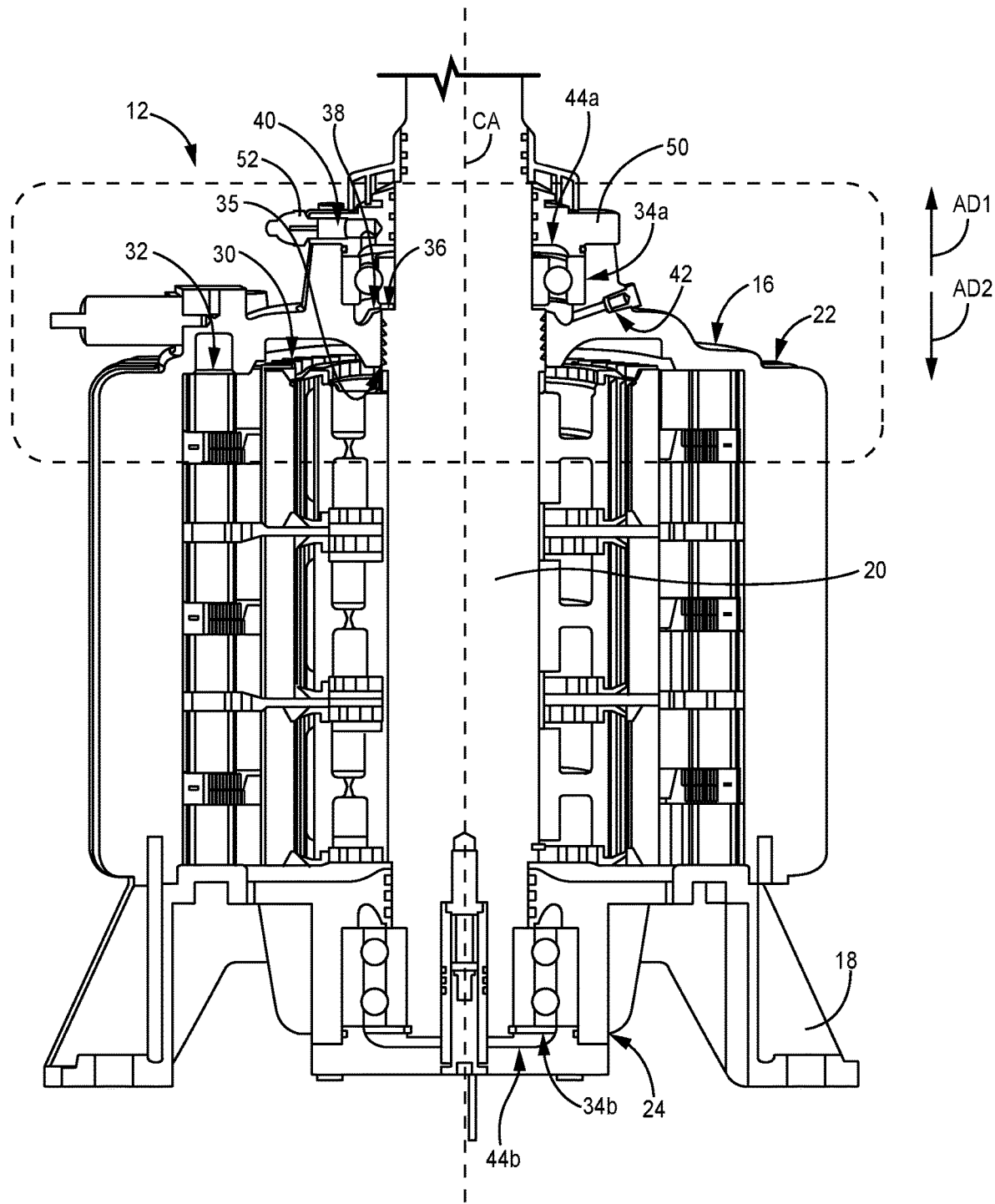
FIG. 2A is a cross-sectional view of the motor of the fan system shown in FIG. 1.
Figure 2B:
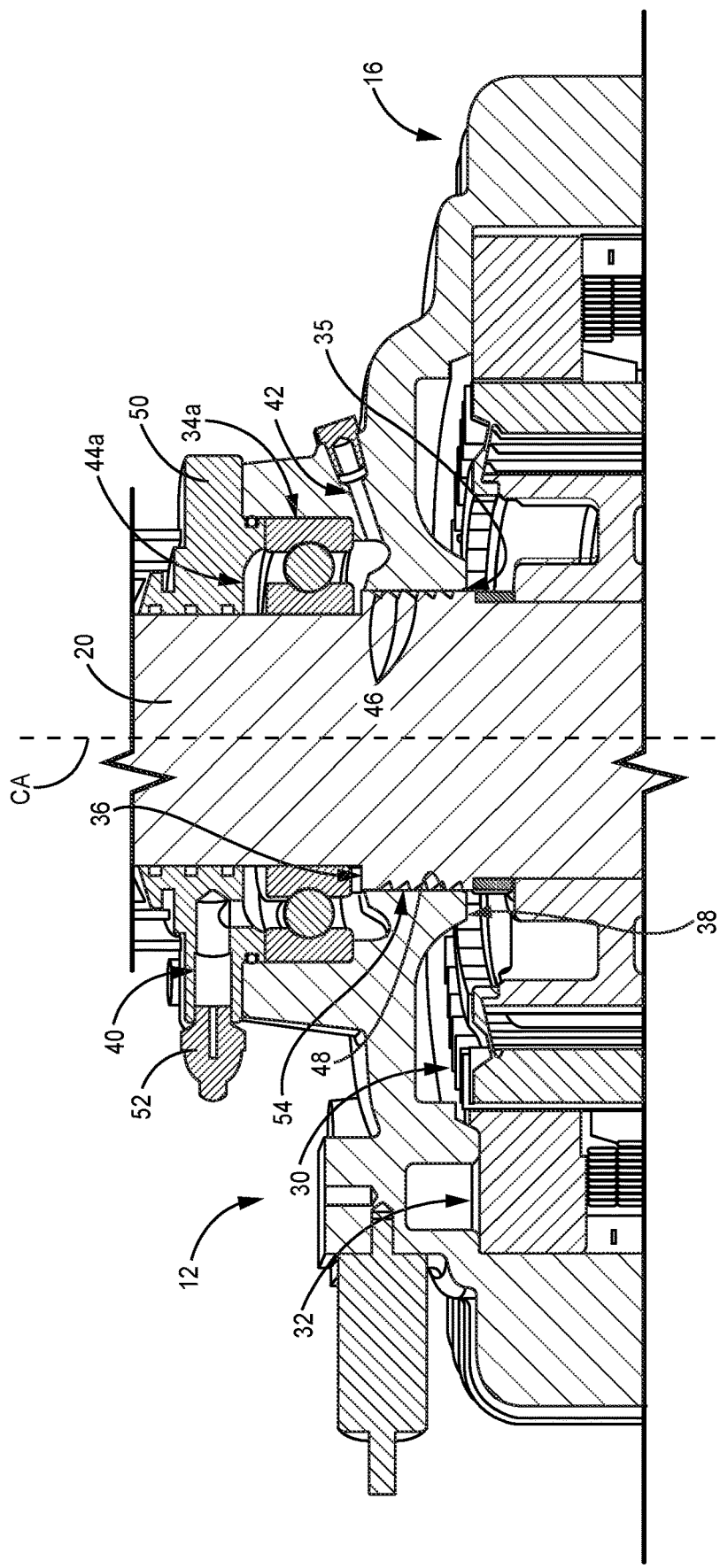
FIG. 2B is an enlarged view of detail B in FIG. 2A.

FIG. 2A is a cross-sectional view of motor 12. FIG. 2B is an enlarged view of detail B in FIG. 2A. FIGS. 2A and 2B will be discussed together. Motor 12 includes motor housing 16; supports 18; drive shaft 20; rotor 30; stator 32; bearing assemblies 34a, 34b; inner member 36; outer ring 38; grease inlet 40; grease outlet 42; and grease chambers 44a, 44b.

Rotor 30 is configured to rotate on the common axis CA to generate a rotational output. In the example shown, rotor 30 is disposed radially within stator 32 such that motor 12 can be considered to be an inner rotating motor, though it is understood that not all examples are so limited. Rotor 30 includes permanent magnets that are electromagnetically driven about the common axis CA by electromagnetic fields generated by the stator 32. Stator 32 is disposed coaxially with rotor 30 on the axis of rotation of rotor 30, which is coaxial with the common axis CA.

Drive shaft 20 is supported by a body of rotor 30 to rotate with rotor 30. Drive shaft 20 extends through the axial end of motor housing 16 oriented in first axial direction AD1. The portion of drive shaft 20 disposed outside of motor housing 16 can connect to another component of the system to directly provide the rotational output from motor 12 to the component, such as to blade assembly 14, among other options. Drive shaft 20 and rotor 30 rotate in a 1:1 relationship. Drive shaft 20 completes one revolution for every one revolution of rotor 30. In the example shown in FIG. 1, blade assembly 14 is directly mounted to drive shaft 20 to rotate in a 1:1 relationship. Motor 12 thereby drives blade assembly 14 in a 1:1 relationship. The direct drive relationship provides high responsiveness and a large speed range relative to traditional outputs having reduction gearing. While drive shaft 20 is shown as extending out of motor housing 16 such that drive shaft 20 extends fully through grease chamber 44a, it is understood that not all examples are so limited. In some examples, drive shaft 20 can extend into grease chamber 44a to interface with bearing assembly 34a, but may not extend fully through grease chamber 44a.

Bearing assemblies 34a, 34b are disposed to support rotation of rotor 30. Drive shaft 20 extends to interface with each bearing assembly 34a, 34b. In the example shown, drive shaft 20 extends through each bearing assembly 34a, 34b. Drive shaft 20 interfaces with the inner race of each bearing assembly 34a, 34b, in the example shown. Drive shaft is rotatably supported by bearing assemblies 34a, 34b. Bearing assemblies 34a, 34b can be of any desired configuration for supporting rotation of rotor 30 and axial loads experienced by motor 12. For example, bearing assemblies 34a, 34b can be ball bearings, roller bearings, etc. In example shown, bearing assembly 34a is disposed axially between bearing assembly 34b and the first portion of drive shaft 20 that is disposed outside of motor housing 16. Bearing assembly 34a is thus disposed axially between the blade assembly 14 and bearing assembly 34b. Bearing assembly 34a can be disposed vertically above bearing assembly 34b such that bearing assembly 34a can be considered to be an upper bearing while bearing assembly 34b can be considered to be a lower bearing.

Bearing assembly 34a is disposed within grease chamber 44a formed within motor housing 16. In the example shown, end cap 50 of motor housing 16 is mounted to motor housing 16 to enclose grease chamber 44a. Grease chamber 44a is configured to store a volume of grease during operation. The grease lubricates bearing assembly 34a during operation.

Grease inlet 40 is fluidly connected to grease chamber 44a. Grease inlet 40 extends through end cap 50 in the example shown, though it is understood that grease inlet 40 can extend through any component of motor housing 16 to fluidly connect with grease chamber 44a. Grease inlet 40 includes a fitting 52 to which a user can connect a supply hose to inject grease into grease chamber 44a through grease inlet 40. Grease outlet 42 is fluidly connected to grease chamber 44a. Grease outlet 42 includes a plug that can be removed from the passage of grease outlet 42 to allow grease to exit from grease chamber 44a or to prevent overpressurization of grease chamber 44a during filling of grease chamber 44a.

Bearing assembly 34b is disposed within grease chamber 44a formed within motor housing 16. Grease chamber 44b is configured to store a volume of grease during operation. The grease lubricates bearing assembly 34b during operation.

Grease chamber 44a is disposed vertically above motor 12 with common axis CA oriented vertically. Due to the pull of gravity, the grease is pulled to flow downward in second axial direction AD2 along the drive shaft 20. It is desirable that the grease that lubricates bearing assembly 34a does not leak down drive shaft 20 and to the interior of electric motor 12. A grease dam formed at the interface 54 between inner member 36 and outer ring 38 inhibits flow of grease in second axial direction AD2 along drive shaft 20 and towards the interior of motor 12, as discussed in more detail below. Inner member 36 and outer ring 38 can be considered to form a grease inhibitor 35 that can discourage flow of grease in second axial direction AD2 along drive shaft 20 and/or pump grease that does enter into interface 54 back in first axial direction AD1 and towards grease chamber 44a.

Inner member 36 is configured to rotate with drive shaft 20. Inner member 36 can also be referred to as an inner round member, in some examples. Inner member 36 is configured to rotate with rotor 30 of motor 12. Inner member 36 can be formed separately from other components of drive shaft 20 and assembled to those components or can be formed integrally with other portions of drive shaft 20. In some examples, inner member 36 and other portions of drive shaft 20 are formed monolithically. Inner member 36 projects radially outward relative to common axis CA and towards outer ring 38. It is understood, however, that inner member 36 does not directly contact outer ring 38.

Grooves 46 are formed on the exterior surface of inner member 36. Grooves 46 extend into the radially exterior surface of inner member 36. Grooves 46 are configured to extend both axially relative to common axis CA and at least partially about the common axis CA. Inner member 36 can include multiple individual grooves 46 that each extend axially and about common axis CA. In some examples, the grooves 46 are separate from each other and do not intersect. In other examples, some of grooves 46 may intersect and crossover other ones of grooves 46. In some examples, grooves 46 are formed as helical grooves on the exterior of inner member 36. It is understood, however, that grooves 46 can be of any desired shape that extends both axially and at least partially circumferentially about common axis CA. Grooves 46 include open ends that are exposed to the grease chamber 44a. Grooves 46 are radially open towards the outer ring 38. In some examples, grooves 46 include open ends on the opposite axial end of inner member 36 from grease chamber 44a. Inner member 36 is disposed within outer ring 38 such that grooves 46 radially overlap with outer ring 38.

Outer ring 38 extends annularly about inner member 36. Outer ring 38 includes ring face 48 that is oriented radially inwards towards common axis CA. Interface 54 is formed between ring face 48 and the exterior of inner member 36 on which grooves 46 are formed. Outer ring 38 can be formed integrally with other components of motor housing 16 or can be formed separately from motor housing 16 and mounted to motor housing 16. Outer ring 38 is disposed such that inner member 36 rotates relative to outer ring 38. In the example shown, outer ring 38 is configured to remain static as inner member 36 rotates within outer ring 38, though it is understood that not all examples are so limited. Ring face 48 is oriented radially inward and directly opposes inner member 36. Ring face 48 can be a planar surface. Ring face 48 can be configured as a cylindrical surface about common axis CA. Ring face 48 can be configured such that grooves are not formed in the surface of ring face 48 at interface 54. Outer ring 38 is configured to remain stationary as inner member 36 rotates relative to outer ring 38.

Inner member 36 and outer ring 38 operatively interface to form a grease inhibitor 35. The grease inhibitor 35 is configured to inhibit grease flow in second axial direction AD2 into the interior of electric motor 12. Outer ring 38 and inner member 36 are spaced radially from each other such that inner member 36 is not in contact with outer ring 38 as inner member 36 rotates relative to outer ring 38. There may be only a radial gap of about 0.0254 millimeters (mm) (about 0.001 inches (in.)) to about 2.54 mm (about 0.1 in.) between the inner cylindrical surface of the outer ring 38 and the radial exterior of inner member 36 at interface 54. The grooves 46 rotate to scrape grease against, and off of, the outer ring 38 without inner member 36 touching the outer ring 38 itself, being that the grease itself is viscous and has a tendency to bead.

The grooves 46 can scoop the grease off of outer ring 38 and convey the grease along the groove 46 back to grease chamber 44a. As discussed above, the grooves 46 can each include an open end that is open to grease chamber 44. The open end can be configured to expel the grease back into grease chamber 44a.

Grease inhibitor 35 formed by inner member 36 and outer ring 38 provides significant advantages. Inner member 36 and outer ring 38 are in a non-contacting arrangement such that inner member 36 and outer ring 38 do not wear on each other. The radial gap between inner member 36 and outer ring 38 at interface 54 is sized to inhibit flow of the viscous grease in second axial direction AD2 towards the interior of motor 12. As such, grease inhibitor 35 can, in some examples, be considered to function as a grease seal that prevents flow of grease in second axial direction AD2 along drive shaft 20. Grooves 46 pick grease up off of ring face 48 and are configured to convey the grease back to grease chamber 44a. As such, grease inhibitor 35 can, in some examples, be considered to function as a grease pump that pumps the grease back into the grease chamber 44a. The inner member 36 can both inhibit flow of grease out of grease chamber 44a and into the interior of motor 12 and pump the grease back into the grease chamber 44a, inhibiting depletion of the volume of grease within the grease chamber 44a.

Figure 3A:
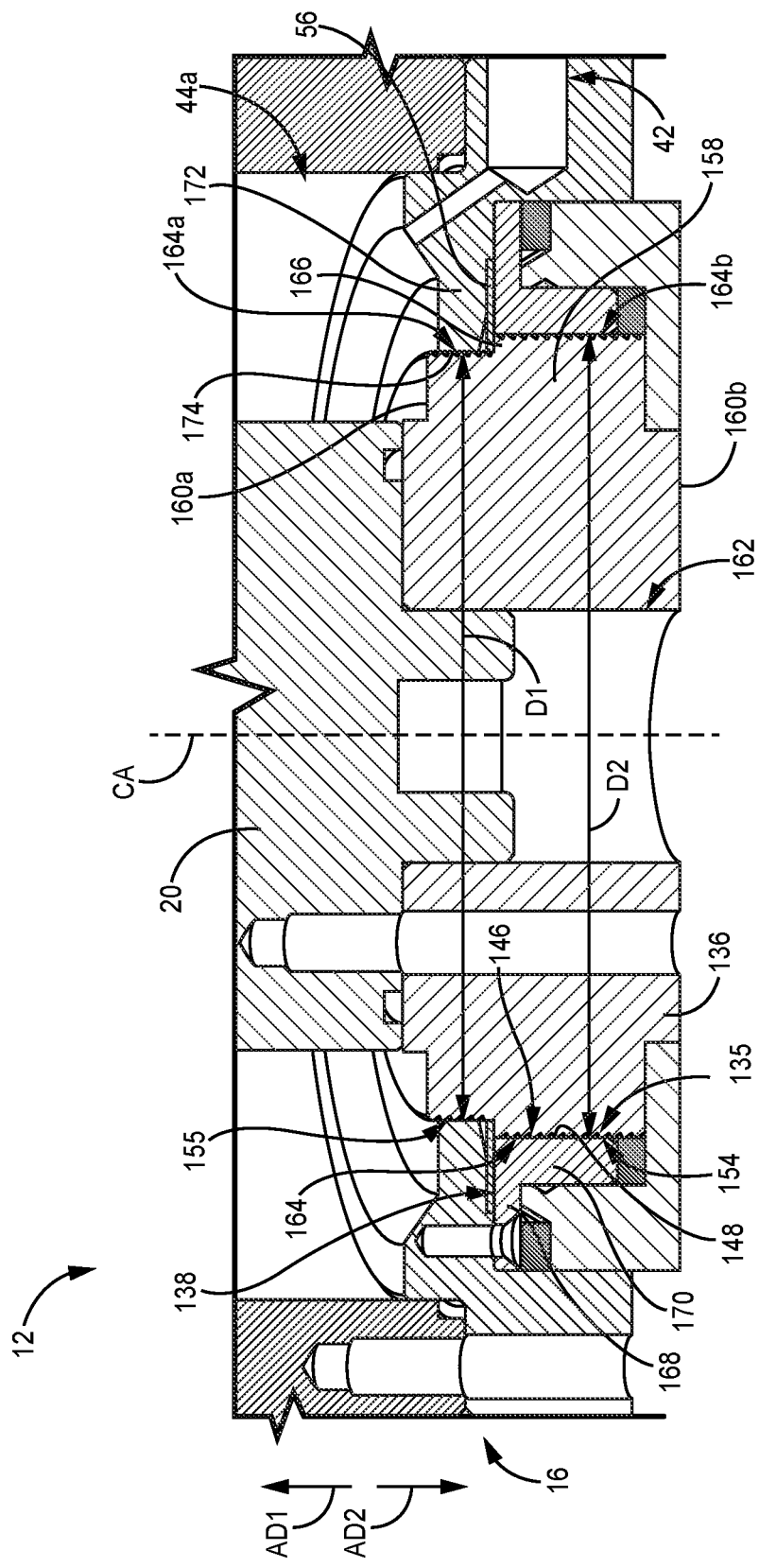
FIG. 3A is an enlarged cross-sectional view of a portion of an electric motor.
Figure 3B:
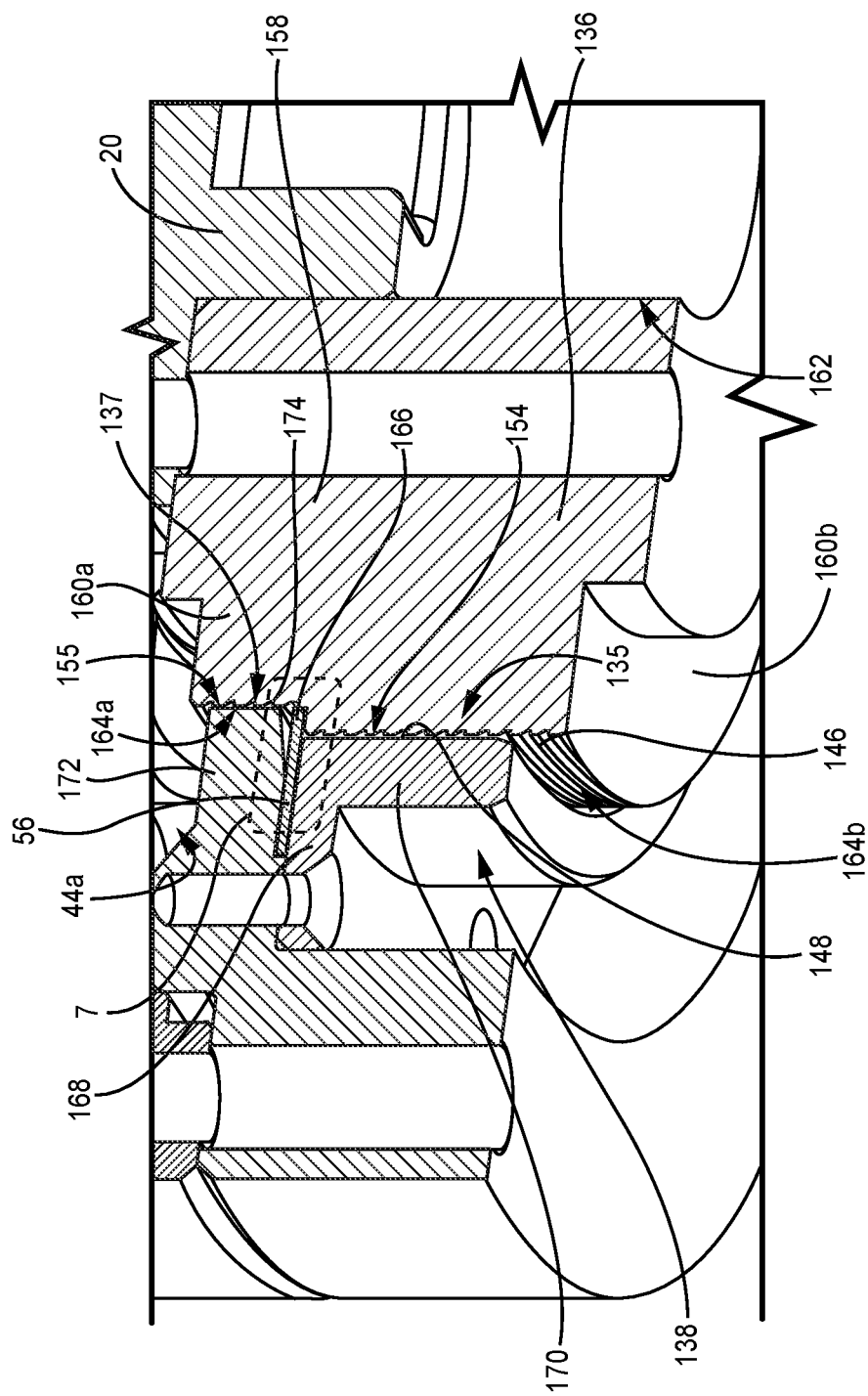
FIG. 3B is an enlarged view of detail B in FIG. 3A.

FIG. 3A is an enlarged cross-sectional view of a portion of motor 12 showing the interface 154 between inner member 136 and outer ring 138. FIG. 3B is an isometric enlarged view of detail B in FIG. 3A. FIGS. 3A and 3B will be discussed together. Motor housing 16, grease inhibitor 135, grease outlet 42, grease chamber 44a, and ring seal 56 are shown. Grease inhibitor 135 includes inner member 136, outer ring 138, Inner member 136 includes member body 158 extending axially between member ends 160a, 160b; shaft bore 162; exterior surfaces 164a, 164b; shelf 166; and grooves 146. Outer ring 138 includes ring face 148, mount flange 168, and seal flange 170.

Grease inhibitor 135 is substantively similar to grease inhibitor 135 shown in FIGS. 2A and 2B and the reference numerals have been increased by "100" for like components. Inner member 136 is substantively similar to inner member 36 shown in FIGS. 2A and 2B and the reference numerals have been increased by "100" for like components. Outer ring 138 is substantively similar to inner member 36 shown in FIGS. 2A and 2B and the reference numerals have been increased by "100" for like components.

Inner member 136 and outer ring 138 interface to form a grease inhibitor 135 that retains grease within grease chamber 44a. As discussed above, grease chamber 44a can be positioned vertically above the electromagnetic components of the motor 12 (e.g., the rotor 30 and stator 32). It is desirable that grease is not permitted to flow to such electromagnetic components.

Outer ring 138 is supported by motor housing 16. In the example shown, outer ring 138 can be fixed to motor housing 16, such as by fasteners, such as bolts, among other options. While outer ring 138 is shown as formed separately from and mounted to motor housing 16, it is understood that not all examples are so limited. For example, outer ring 138 can be formed integrally with or permanently connected to a component of motor housing 16. In some examples, outer ring 138 can be monolithic with a component of motor housing 16.

Mount flange 168 extends radially outward relative to common axis CA. In the example shown, mount flange 168 interfaces with motor housing 16 to secure outer ring 138 to motor housing 16. As shown, fastener openings, through which a fastener can extend, extend through mount flange 168. Seal flange 170 extends from a portion of mount flange 168 radially inward of the interface between outer ring 138 and motor housing 16. In some examples seal flange 170 can extend from a radially innermost portion of mount flange 168. Seal flange 170 extends axially relative to mount flange 168. Seal flange 170 extends in second axial direction AD2 towards the electromagnetic components of motor 12 in the example shown.

Ring face 148 is formed as a radially oriented surface of seal flange 170. Ring face 148 directly opposes the grooved exterior surface 164*b* of inner member 136. Ring face 148 and exterior surface 164*b* function to form grease inhibitor 135. Ring face 148 can be formed as a cylindrical face about common axis CA. Interface 154 is formed between the grooved exterior surface 164*b* and ring face 148.

Inner member 136 is configured to rotate on common axis CA during operation. Inner member 136 can be disposed coaxially with drive shaft 20 to rotate with drive shaft 20. Member body 158 extends axially between member ends 160*a*, 160*b*. Retainer end 160*a* is oriented in first axial direction AD1 and towards the bearing assembly 34*a* and retainer end 160*b* is oriented in second axial direction AD2 and towards the interior of motor 12. In the example shown, inner member 136 is formed separately from and assembled to other components of drive shaft 20, though it is understood that not all examples are so limited.

Shaft bore 162 extends axially through inner member 136. In the example shown, shaft bore 162 extends fully axially through inner member 136 between member ends 160*a*, 160*b*. Components of drive shaft 20, such as a motor shaft that extends from rotor 30 and an output shaft that extends through bearing assembly 34*a* and out of motor housing 16, can interface within shaft bore 162 to connect to each other within shaft bore. It is understood that some examples of inner member 136, such as examples in which inner member 136 is integrally formed with other components of drive shaft 20, do not include shaft bore 162.

The radially outer surfaces of inner member 136 are formed as exterior surface 164*a* and exterior surface 164*b* in the example shown. Exterior surfaces 164*a*, 164*b* are oriented radially outward, away from common axis CA in the example shown. Exterior surface 164*a* extends in second axial direction AD2 from retainer end 160*a*. Exterior surface 164*b* extends in second axial direction AD2 relative to exterior surface 164*a*. The portion of inner member 136 extending to exterior surface 164*a* has a first diameter D1. The portion of inner member 136 extending to exterior surface 164*b* has a second diameter D2, larger than the first diameter D1. While inner member 136 is shown as including dual grooved surfaces (e.g., exterior surfaces 164*a*, 164*b*), it is understood that not all examples are so limited. For example, inner member 136 may include only a single grooved surface, such as exterior surface 164*b* that forms grease inhibitor 135.

Shelf 166 extends radially between exterior surface 164*a* and exterior surface 164*b*. Shelf 166 is oriented in first axial direction AD1. Shelf 166 can be formed as a planar surface orthogonal to the common axis CA. Shelf 166 extends fully annularly around common axis CA in the example shown. Grooves are not formed in the axial face of shelf 166 oriented in first axial direction AD1 in the example shown.

Grooves 146 are formed on the radially outer side of inner member 136. In the example shown, a first subset of the grooves 146 is formed on exterior surface 164*a* and a second subset of the grooves 146 that is formed on exterior surface 164*b*. Grooves 146 are configured to extend both axially along inner member 136 and circumferentially about common axis CA. The grooves 146 on exterior surface 164*a* extend to openings open in first axial direction AD1. The openings can be referred to as terminal openings as the openings are at the terminal ends of the grooves 146. The grooves 146 on exterior surface 164*a* extend to openings that are formed in retainer end 160*a*. The grooves 146 on exterior surface 164*b* extend to openings open in first axial direction AD1. The grooves 146 on exterior surface 164*b* extend to openings that are formed on shelf 166. The openings are formed on the outer radial edge of shelf 166.

It is understood that grooves 146 can extend both axially and circumferentially in any desired manner. For example, grooves 146 can be formed as helical grooves, grooves 146 can be formed as a series of steps that extend circumferentially and axially, grooves 146 can be formed as canted grooves that extend straight to the opening oriented in first axial direction AD1. The grooves 146 can be formed in any desired orientation that extends both axially towards the grease chamber 44*a* and at least partially around common axis CA.

Exterior surface 164*a* directly opposes and radially overlaps with housing projection 172 of motor housing 16. Inner surface 174 is formed as a radially oriented surface of housing projection 172. Inner surface 174 directly opposes the grooved exterior surface 164*a* of inner member 136. Inner surface 174 and exterior surface 164*a* can function to form a grease dam. Inner surface 174 can be formed as a cylindrical face about common axis CA.

While inner member 136 is shown as including a first subset of grooves 146 and a second subset of grooves 146, it is understood that not all examples are so limited. For example, inner member 136 can be configured to include only grooves 146 formed on exterior surface 164*b*. Inner member 136 can thus be configured to form a single grease inhibiting interface 154, such as between inner member 136 and outer ring 138.

During operation, inner member 136 rotates on common axis CA and relative to outer ring 138. Grooves 146 rotate with inner member 136 and relative to the opposed surfaces formed by motor housing 16 and outer ring 138. Inner member 136 is spaced radially inward of and not in contact with motor housing 16 and outer ring 138. The surfaces of motor housing 16 and outer ring 138 can be static as inner member 136 rotates relative to such surfaces.

Inner member 136 and outer ring 138 operatively interface to form grease inhibitor 135 at the interface 154 between exterior surface 164*b* and outer ring 138. It is understood that the interface 154 is a non-contact interface as exterior surface 164*b* is not in contact with outer ring 138. The grease inhibitor 135 is configured to inhibit grease flow in second axial direction AD2 towards the interior of electric motor 12. Outer ring 138 and inner member 136 are spaced radially from each other such that inner member 136 is not in contact with outer ring 138 as inner member 136 rotates relative to outer ring 138. Grooves 146 rotate to scrape grease against, and off of, the outer ring 138 without inner member 136 touching the outer ring 138 itself, being that the grease itself is viscous and has a tendency to bead. Such relative rotation can drive any captured grease in first axial direction AD1 and back towards grease chamber 44a.

Inner member 136 can further form a second grease inhibitor 137 at the interface 155 between exterior surface 164a and housing projection 172. It is understood that the interface 155 is a non-contact interface as exterior surface 164a is not in contact with housing projection 172. The grease inhibitor 137 is similar to grease inhibitor 135 in that the grease inhibitor 137 is configured to inhibit grease flow in second axial direction AD2 into the interior of electric motor 12. Housing projection 172 and exterior surface 164a are spaced radially from each other such that inner member 136 is not in contact with housing projection 172 as inner member 136 rotates relative to housing projection 172. Grooves 146 rotate to scrape grease against, and off of, the housing projection 172 without inner member 136 touching the housing projection 172 itself, being that the grease itself is viscous and has a tendency to bead. Such relative rotation can drive any captured grease in first axial direction AD1 and back towards grease chamber 44a.

Ring seal 56 extends annularly about common axis CA. Ring seal 56 is disposed on outer ring 138. A portion of ring seal 56 can be captured between outer ring 138 and motor housing 16. In some examples, the portion of ring seal 56 can be clamped between outer ring 138 and motor housing 16. Ring seal 56 is configured to remain stationary about common axis CA as drive shaft 20 and inner member 136 rotate on common axis CA.

Ring seal 56 extends radially inward to axially overlap with both outer ring 138 and inner member 136. Ring seal 56 projects radially inward such that ring seal 56 extends over the interface 154 between inner member 136 and outer ring 138. Ring seal 56 axially overlaps with the interface 154 between inner member 136 and outer ring 138 at a location axially between the interface 154 and grease chamber 44a. While ring seal 56 axially overlaps with shelf 166 of inner member 136, it is understood that during normal operation ring seal 56 does not contact inner member 136. Instead, ring seal 56 is spaced axially away from shelf 166 and not in contact with shelf 166. As discussed in more detail below, ring seal 56 is configured to bend to contact and seal against shelf 166 in situations in which grease chamber 44a experiences a pressure rise, such as when an operator fills grease into grease chamber 44a. Ring seal 56 flexing to contact shelf 166 creates a sealed interface that inhibits flow of grease in second axial direction AD2 towards the interior of motor 12.

Inner member 136 can inhibit flow of grease in second axial direction AD2 out of grease chamber 44a. Inner member 136 can pump grease that does flow from grease chamber 44a back in first axial direction AD1 and towards grease chamber 44a. Grooves 146 can scrape grease off of the opposed surface (e.g., scraping grease off of ring face 148) and convey that grease in first axial direction AD1 toward grease chamber 44a within which bearing assembly 34a is disposed. As such, inner member 136 can both inhibit flow of grease out of grease chamber 44a and can pump any grease that does flow into the radial gaps between inner member 136 and outer ring 138 and between inner member 136 and housing projection 172 back towards grease chamber 44a. Inner member 136 thereby inhibits flow of grease to the interior, electromagnetic components of motor 12 and assists in maintaining the volume of grease within grease chamber 44, even in configurations in which gravity tends to pull the grease in second axial direction AD2.

Figure 4:
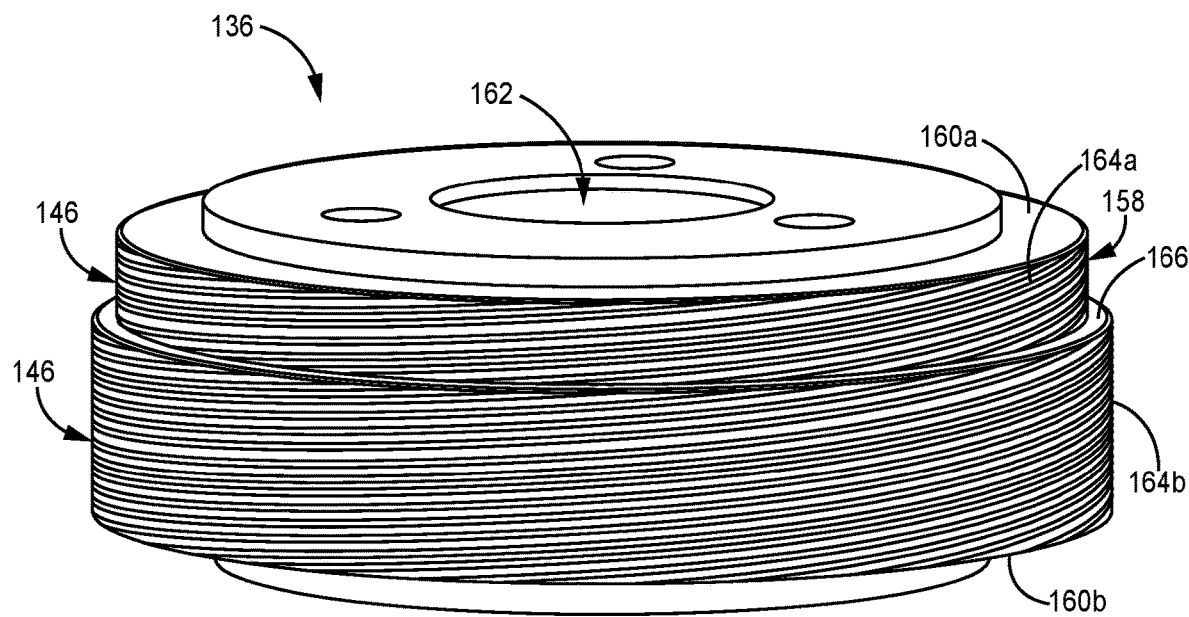
FIG. 4 is an isometric view of a grease retainer.
Figure 5A:
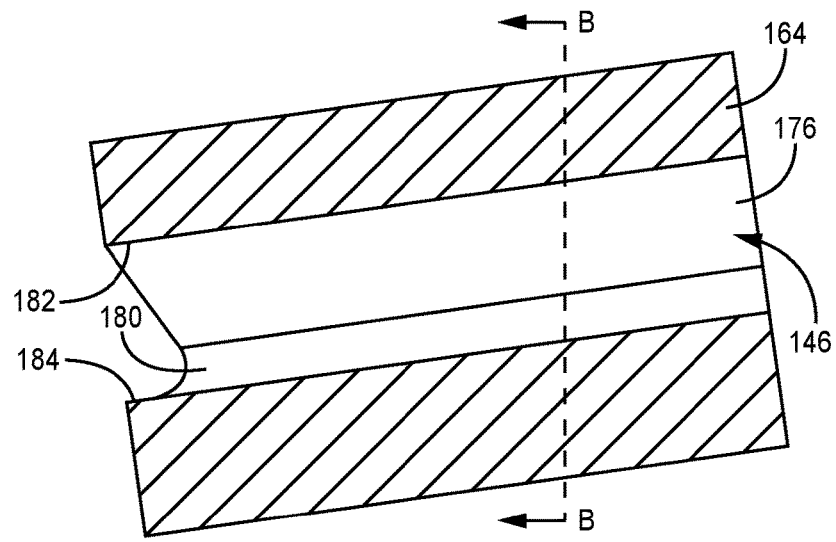
FIG. 5A is an enlarged view of a groove of the grease retainer shown in FIG. 4.
Figure 5B:
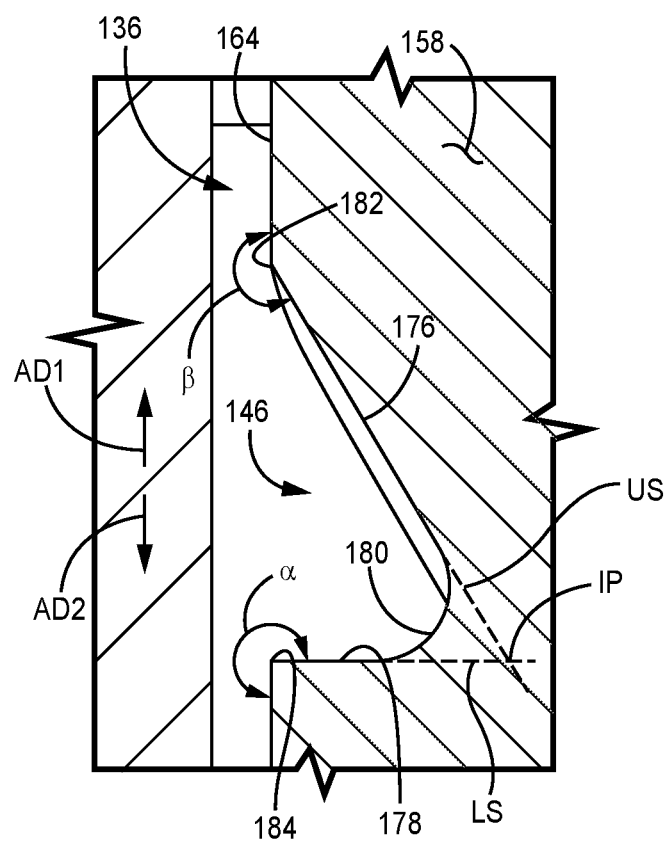
FIG. 5B is a cross-sectional view of a groove taken along line B-B in FIG. 5A.

FIG. 4 is an isometric view of inner member 136. FIG. 5A is an enlarged view of a portion of a groove 146 of the inner member 136 shown in FIG. 4. FIG. 5B is a cross-sectional view of a groove 146 taken along line B-B in FIG. 5A. FIGS. 4-5B will be discussed together. Inner member 136 includes member body 158 extending axially between retainer ends 160a, 160b; shaft bore 162; exterior surfaces 164a, 164b (collectively herein "exterior surface 164" or "exterior surfaces 164"); shelf 166; and grooves 146. Groove 146 includes upper surface 176, lower surface 178, base 180, upper lip 182, and lower lip 184.

Member body 158 extends between retainer ends 160a, 160b. Shaft bore 162 extends through member body 158 and can receive portion of a drive shaft (e.g., drive shaft 20) of a motor (e.g., motor 12). Exterior surfaces 164a, 164b are outer radial surfaces of inner member 136. Shelf 166 extends radially between exterior surface 164a and exterior surface 164b. Grooves 146 are formed on exterior surfaces 164a, 164b.

Inner member 136 is configured to rotate relative to static surfaces of the motor 12. Grooves 146 are configured to scoop grease off of the static surface and convey the grease in first axial direction AD1 and back to a grease reservoir (e.g., grease chamber 44a).

Grooves 146 extend both axially relative to common axis CA and circumferentially around common axis CA. In the example shown, grooves 146 are formed as helical grooves that wrap around inner member 136. It is understood, however, that grooves 146 can be of any configuration that extends both axially and at least partially around common axis CA.

In the example shown, grooves 146 include an upper lip 182 that is disposed on the side of groove 146 in first axial direction AD1 and lower lip 184 that is disposed on the side of groove 146 in second axial direction AD2. For a common location along groove 146, the upper lip 182 is closer to retainer end 160 than lower lip 184. The upper lip 182 is formed at the intersection between groove 146 and an exterior surface 164. The lower lip 184 is formed at the intersection between groove 146 and exterior surface 164.

Groove 146 extends into member body 158 from exterior surface 164. Upper surface 176 extends into member body 158 from upper lip 182. Upper surface 176 extends both radially and axially such that upper surface 176 is a sloped surface. Upper surface 176 extends to base 180 of groove 146. Lower surface 178 extends into member body 158 from lower lip 184. Lower surface 178 extends to base 180 of groove 146. In some examples, lower surface 178 can extend both axially and radially such that lower surface 178 is a sloped surface. In some examples, lower surface 178 extends radially inwards and is not a sloped surface. In some examples, lower surface 178 can be a concave surface such that lower surface 178 extends below lower lip 184 between lower lip 184 and base 180. In the example shown, base 180 is formed as a radiused surface between upper surface 176 and lower surface 178, though it is understood that not all examples are so limited. Base 180 can be considered to form a curved surface.

Upper surface 176 is oriented transverse to the lower surface 178. In the example shown, upper surface 176 is transverse to lower surface 178 such that an intersection point IP between a plane US of the upper surface 176 and a plane LS of the lower surface 178 is configured such that a distance from the upper lip 182 to the intersection point IP along the plane US of the upper surface is greater than a distance from the lower lip 184 to the intersection point IP along the plane LS of the lower surface.

Upper surface 176 can be considered to have a shallower taper than lower surface 178 as upper surface 176 traverses a greater axial distance, relative to common axis CA and as best seen in FIG. 5B, between exterior surface 164 and base 180 than lower surface 178 traverses between exterior surface 164 and base 180. Lower lip 184 can be considered to have a sharper profile than upper lip 182 as the angle α between exterior surface 164 and lower surface 178 around lower lip 184 is greater than the angle R between exterior surface 164 and upper surface 176 around upper lip 182. The angle α can also be referred to as a lower angle. The angle R can also be referred to as an upper angle. In some examples, the lower surface 178 can extend at a right angle relative to the exterior surface 164.

The configuration of groove 146 allows the lower side of the groove 146 (formed by lower lip 184 and lower surface 178) to scoop up grease and advance it upwards in first axial direction AD1 as inner member 136 rotates during operation. The shallower taper of upper surface 176 provides a large surface area along which the grease can flow to be transmitted in first axial direction AD1, facilitating flow of the grease in first axial direction AD1.

The configuration of groove 146 facilitates capture and displacement of grease in first axial direction AD1 as inner member 136 rotates during operation. Inner member 136 can pump the grease along grooves 146 to transmit the grease in first axial direction AD1 and back towards grease chamber 44a.

Figure 6:
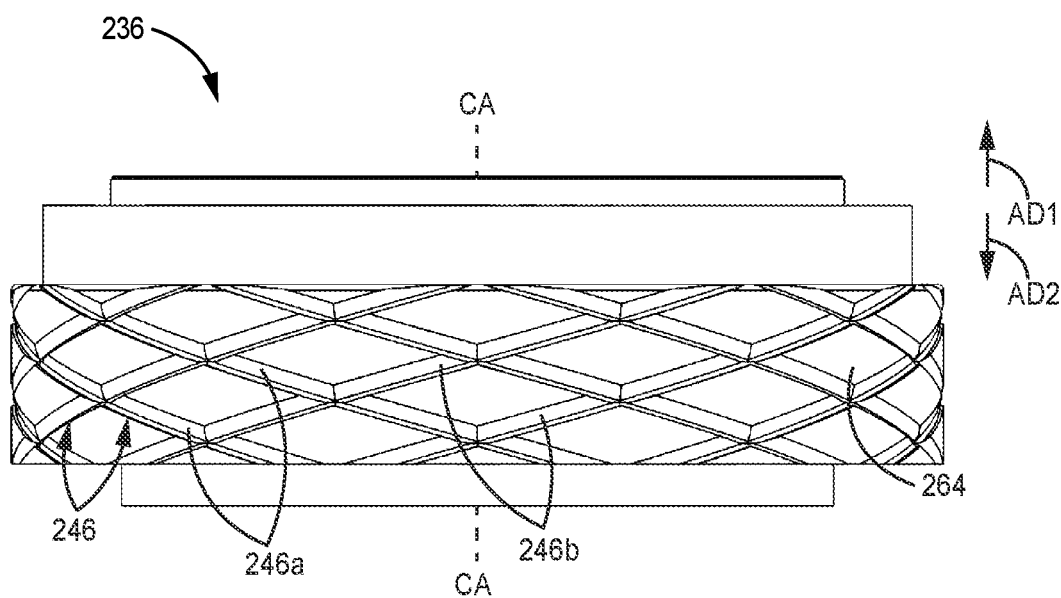
FIG. 6 is an elevational view of another grease retainer.

FIG. 6 is a side elevational view of inner member 236. Inner member 236 is substantially similar to inner member 136 (best seen in FIG. 4) and inner member 36 (FIGS. 2A and 2B) the reference numerals have been increased by "100" relative to inner member 136 and increased by "200" relative to inner member 36 for like components. Grooves 246 of inner member 236 are formed in a dual groove configuration.

Inner member 236 includes grooves 246a formed on exterior surface 264 and grooves 246b formed on exterior surface 264. Grooves 246a, 246b can be collectively referred to herein as "grooves 246" or "groove 246". Grooves 246 are substantively similar to grooves 146 and grooves 46. Grooves 246a extend in a first circumferential direction about the common axis CA and grooves 246b extend in a second circumferential direction about the common axis CA. The dual groove configuration of inner member 236 facilitates displacing grease in first axial direction AD1 and back towards grease reservoir 44a regardless of the direction of rotation of inner member 236.

In the example shown, grooves 246 are disposed in a double helix configuration. Grooves 246a intersect with grooves 246b at various locations about inner member 236. The configuration of grooves 246 of inner member 236 shows that the grooves 246 can be interrupted and still function because grease can be moved up in short segments.

Figure 7:
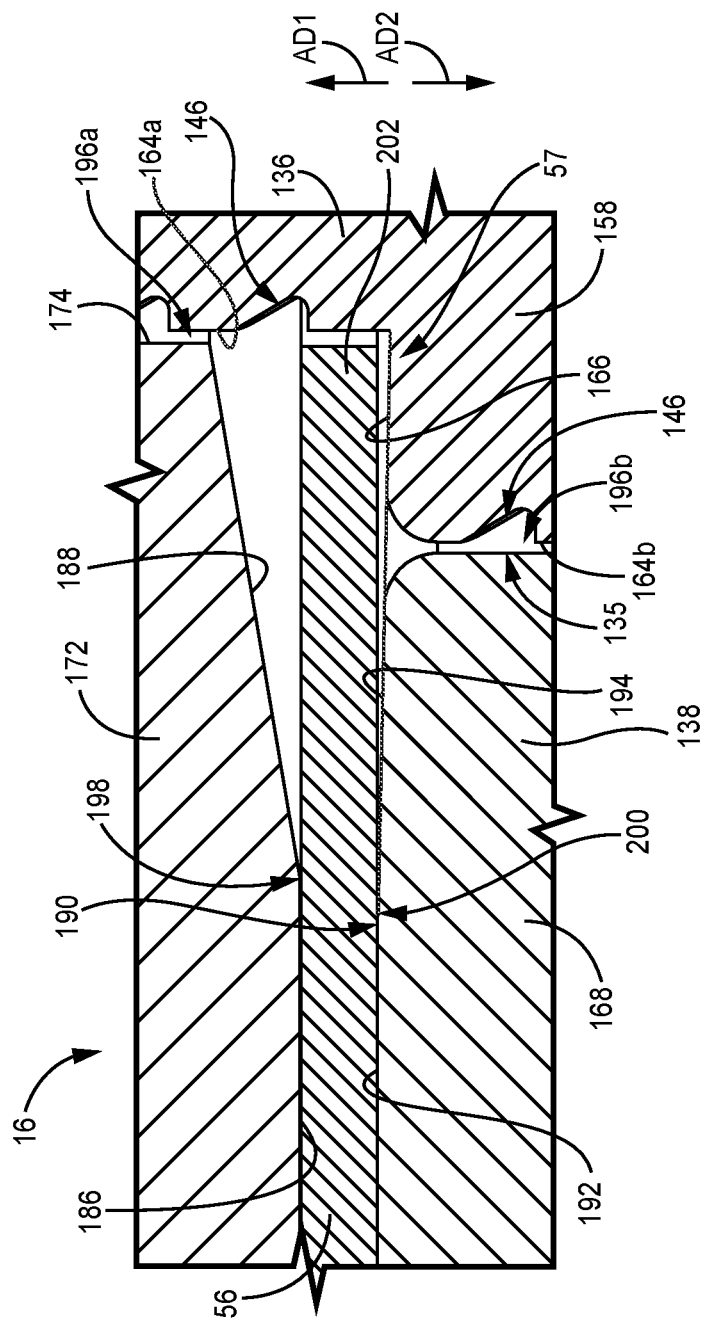
FIG. 7 is an enlarged view of detail 7 in FIG. 3B.

FIG. 7 is an enlarged view of detail 7 in FIG. 3B. Motor housing 16, inner member 136, outer ring 138, and ring seal 56 are shown. Housing projection 172 of motor housing 16 is shown. Housing projection 172 includes inner surface 174, seal support surface 186, and sloped surface 188. Member body 158, exterior surfaces 164a, 164b; shelf 166; and grooves 146 of inner member 136 are shown. Ring face 148, mount flange 168, and mount surface 190 of outer ring 138 are shown. Mount surface 190 includes support face 192 and sloped face 194.

Housing projection 172 is formed as a portion of motor housing 16, in the example shown. Seal support surface 186 is formed by motor housing 16 and is oriented in second axial direction AD2. Inner surface 174 of housing projection 172 is oriented radially inwards towards common axis CA (best seen in FIG. 3A). Inner surface 174 is spaced from exterior surface 164a of inner member 136 by radial gap 196a. Sloped surface 188 extends between seal support surface 186 and inner surface 174. Sloped surface 188 is canted relative to common axis CA such that sloped surface 188 extends both axially and radially between seal support surface 186 and inner surface 174. Sloped surface 188 extends in first axial direction AD1 and radially inwards towards common axis CA between seal support surface 186 and inner surface 174.

Outer ring 138 is disposed radially outward of inner member 136. Ring face 148 is oriented radially inwards towards common axis CA. Ring face 148 is spaced from exterior surface 164b of inner member 136 by radial gap 196b at interface 154. Mount surface 190 is extends radially and is oriented in first axial direction AD1. Support face 192 is oriented in first axial direction AD1. Support face 192 can be a planar face oriented in first axial direction AD1. Sloped face 194 extends radially inwards from support face 192. Sloped face 194 is sloped to extend in both second axial direction AD2 and radially inwards towards common axis CA.

Ring seal 56 is supported between motor housing 16 and outer ring 138. In some examples, ring seal 56 can be considered to be clamped between motor housing 16 and outer ring 138. Ring seal 56 is clamped between seal support surface 186 and mount surface 190 in the example shown. Ring seal 56 engages with both seal support surface 186 and support face 192. Ring seal 56 is supported such that ring seal 56 remains stationary as inner member 136 rotates relative to ring seal 56.

Ring seal 56 and inner member 136 form grease inhibitor 57. Ring seal 56 extends radially inwards towards common axis CA. Ring seal 56 extends to axially overlap with the interface 154 between inner member 136 and outer ring 138. Ring seal 56 axially overlaps with shelf 166 of inner member 136.

Ring seal 56 extends radially inward from upper contact point 198 at which location ring seal 56 engages motor housing 16 at the interface between seal support surface 186 and sloped surface 188. The upper contact point 198 is the radially innermost point of contact between ring seal 56 and motor housing 16.

Ring seal 56 extends radially inward from lower contact point 200 at which location ring seal 56 engages outer ring 138 at the interface between support face 192 and sloped face 194. Ring seal 56 is cantilevered radially inwards towards common axis CA. The lower contact point 200 is the radially innermost point of contact between ring seal 56 and outer ring 138 with ring seal 56 in a disengaged state, as discussed in more detail below.

In the example shown, upper contact point 198 is disposed radially inwards from lower contact point 200. Upper contact point 198 is radially closer to common axis CA than lower contact point 200. As such, ring seal 56 can be considered to engage with seal support surface 186 for a greater radial extent than ring seal 56 engages with outer ring 138. The upper contact point 198 being radially inwards of the lower contact point 200 slightly cants the cantilevered portion of ring seal 56 downwards in second axial direction AD2. Such a configuration displaces the distal free end 202 of ring seal 56 slightly in second axial direction AD2, facilitating easier displacement of ring seal 56 in second axial direction AD2 and into an engaged state.

Grease inhibitor 57 is configured to prevent migration of grease in second axial direction AD2 in response to increased pressure in grease reservoir 44a. It is understood that ring seal 56 and inner member 136 can form the grease inhibitor 57 even in examples in which inner member 136 does not include grooves 146. It is understood that motor 12 can include grease inhibitor 57 without also including grease inhibitors, 35, 135, 137. Motor 12 can include only one or more than one of grease inhibitors 35, 57, 135, 137.

Ring seal 56 is shown in a normal, disengaged state in FIG. 7 in which ring seal 56 does not contact inner member 136. In the disengaged state, ring seal 56 is spaced both axially and radially relative to inner member 136. Ring seal 56 being disengaged from inner member 136 prevents contact wear to ring seal 56 due to relative rotation of inner member 136. Ring seal 56 is responsive to pressure increases in grease reservoir 44a. Ring seal 56 can also be referred to as a dynamic ring seal and ring seal 56 dynamically reacts to the grease pressure. For example, if an operator inadvertently overfills the grease reservoir 44a, the increased pressure in the grease reservoir 44a pushes grease down on the cantilevered radially inward side of the ring seal 56 causing the cantilevered free end 202 of ring seal 56 to flex downward in second axial direction AD2 to annularly engage the shelf 166 of inner member 136. Such engagement creates a seal that prevents grease from flowing into interface 154 and thus seals off migration of the grease towards the electromagnetic components of motor 12. It is understood that ring seal 56 can be formed of any desired material suitable for forming a seal with inner member 136, such as rubber among other options.

While the electric machines of this disclosure are discussed in the context of a fan system, it is understood that electric machines and controls can be utilized in a variety of contexts and systems and are not limited to those discussed. Any one or more of the electric machines discussed can be utilized alone or in unison with one or more additional electric machines to provide mechanical output from an electric signal input for any desired purpose. Further, while the electric machine is generally discussed as being an electric motor, the electric machine can be of any desired form, such as a generator.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A grease inhibitor comprising:
   a vertically orientated shaft configured to rotate on an axis;
   an inner member configured to rotate with the shaft, the inner member having a cylindrical outer surface and at least one groove formed on the cylindrical outer surface; and
   an outer ring within which the at least one groove rotates to one or both of pump grease up in a first axial direction along an annular interface between the outer ring and the cylindrical outer surface and prevent the grease from leaking downward in a second axial direction along the annular interface, wherein the outer ring is spaced radially from the cylindrical outer surface;
   wherein the at least one groove comprises:
      a first groove extending in a first circumferential direction about the axis; and
      a second groove extending in a second circumferential direction about the axis opposite the first circumferential direction, the second groove intersecting the first groove.

2. The grease inhibitor of claim 1, wherein the at least one groove extends both axially relative to the axis and at least partially about the axis.

3. The grease inhibitor of claim 1, wherein the at least one groove includes a terminal opening open upwards along the shaft in the first axial direction.

4. The grease inhibitor of claim 1, wherein the at least one groove is a helical groove.

5. The grease inhibitor claim 1, wherein the outer ring does not contact the cylindrical outer surface.

6. The grease inhibitor of claim 1, wherein the outer ring is spaced radially from the cylindrical outer surface by a gap of 0.0254 millimeters to 2.54 millimeters.

7. The grease inhibitor of claim 1, wherein the at least one groove comprises:
   an upper lip;
   an upper surface extending into a body of the grease inhibitor from the upper lip;
   a lower lip; and
   a lower surface extending into the body of the grease inhibitor from the lower lip.

8. The grease inhibitor of claim 7, wherein the upper surface extends to a base of the groove and the lower surface extends to the base of the groove.

9. The grease inhibitor of claim 8, wherein the base is curved between the upper surface and the lower surface.

10. The grease inhibitor of claim 7, wherein the lower surface extends at a right angle from the outer cylindrical surface.

11. The grease inhibitor claim 1, in which the outer ring includes a cylindrical ring face oriented towards the axis and disposed annularly about the axis, the cylindrical ring face defining an outer radial side of the annular interface.

12. The grease inhibitor of claim 1, further comprising:
   a ring seal disposed annularly about the axis, the ring seal including a cantilevered portion extending inward towards the axis and over an annular shelf of the inner member, the ring seal disposed such that the ring seal is normally in a disengaged state in which the cantilevered portion is spaced from the shelf.

13. The grease inhibitor of claim 12, wherein the ring seal is configured to flex to an engaged state in which the cantilevered portion contacts the shelf in response to increased grease pressure in a grease reservoir spaced in the first axial direction from the annular interface.

14. An electric machine comprising:
   a rotor configured to rotate on a common axis;
   a stator configured to drive rotation of the rotor;
   a grease reservoir configured to store a volume of grease;
   a bearing assembly disposed within the grease reservoir; and
   the grease inhibitor of claim 1, the shaft connected to the rotor to be rotated by the rotor, the shaft rotatably supported by the bearing assembly to rotate relative to a motor body within which the stator is disposed, the shaft extending into the grease reservoir such that the annular interface is disposed axially between the bearing assembly and the stator, and the axis disposed coaxially with the common axis.

15. A grease inhibitor comprising:
a vertically orientated shaft configured to rotate on an axis;
an inner member configured to rotate with the shaft, the inner member having a cylindrical outer surface and at least one groove formed on the cylindrical outer surface; and
an outer ring within which the at least one groove rotates to one or both of pump grease up in a first axial direction along an annular interface between the outer ring and the cylindrical outer surface and prevent the grease from leaking downward in a second axial direction along the annular interface, wherein the outer ring is spaced radially from the cylindrical outer surface;
wherein the at least one groove comprises:
an upper lip;
an upper surface extending into a body of the grease inhibitor from the upper lip, the upper surface extending to the base of the groove;
a lower lip; and
a lower surface extending into the body of the grease inhibitor from the lower lip, the lower surface extending to the base of the groove;
wherein the upper surface extends a greater axial distance from the base than the lower surface.

16. A grease inhibitor comprising:
a vertically orientated shaft configured to rotate on an axis;
an inner member configured to rotate with the shaft;
an outer ring within which the shaft rotates; and
a dynamic ring seal mounted on the outer ring, the dynamic ring seal extending inward to overlap with the inner member, the inner member rotating relative to the dynamic seal, the dynamic ring seal including a cantilevered portion extending inward towards the axis and over an annular shelf of the inner member, the ring seal disposed such that the ring seal is normally in a disengaged state in which the cantilevered portion is spaced from the shelf;
wherein the dynamic ring seal is configured to bend to engage the inner round member in response to increased grease pressure, the increased grease pressure pushing grease against the dynamic seal ring to flex the dynamic ring seal against the inner member to inhibit migration of grease along the vertically oriented shaft.

* * * * *